United States Patent
Bidell et al.

[15] 3,706,933

[45] Dec. 19, 1972

[54] SYNCHRONIZING SYSTEMS IN THE PRESENCE OF NOISE

[72] Inventors: Frederick W. Bidell, Grand Island, N.Y.; Carl D. Herold, Jr., Sunnyvale, Calif.; James H. Lindholm, Kenmore, N.Y.

[73] Assignee: Sylvania Electric Products Inc.

[22] Filed: Sept. 17, 1963

[21] Appl. No.: 310,969

[52] U.S. Cl. ................325/479, 178/69.5 R, 325/32, 325/42, 325/474

[51] Int. Cl. ...........H04l 7/00, H04l 9/00, H04b 3/28

[58] Field of Search..........325/474, 477, 479, 32, 42, 325/323

[56] References Cited

UNITED STATES PATENTS 3,216,012 11/1965 Hirsch ................................324/474

*Primary Examiner*—Benjamin A. Borchelt
*Assistant Examiner*—H. A. Birmiel
*Attorney*—Norman J. O'Malley and Spencer E. Olson

EXEMPLARY CLAIM

11. In the receiver of a pseudo-random communication system in which a locally generated coded signal is to be correlated with a received similarly coded signal, means for recognizing the synchronization of said local and received signals in the presence of undesired received energy, such as noise, interference, jamming or combinations thereof, which comprises: a signal channel having input and output terminals and including in series connection between said input and output terminals a first mixer circuit, a first intermediate frequency amplifier having a bandwidth much narrower than the bandwidth of said received signal, and a first detector and filter circuit; a reference channel having an input terminal in common with said signal channel, and an output terminal, said reference channel including in series connection between its input and output terminals a second mixer circuit, a second intermediate frequency amplifier having substantially the same bandwidth as said first intermediate frequency amplifier, and a second detector and filter; means for applying said received coded signal plus undesired energy to said common input terminal; means for applying said locally generated coded signal to said first mixer; means for applying an orthogonally related version of said locally generated coded signal to said second mixer; said signal channel having a gain factor to produce a signal level at the output terminal of said signal channel lower than the signal level at the output terminal of said reference channel when said received and locally generated coded signals are not synchronized and to produce a larger signal level at the output terminal of said signal channel than the signal level at the output terminal of said reference channel when said received and locally generated coded signals are synchronized; and, means connected to the output terminals of said signal and reference channels for comparing the levels of signals appearing thereat and operative to provide an output signal indicative of which level is higher.

14 Claims, 10 Drawing Figures

INVENTORS:
FREDERICK W. BIDELL
CARL D. HEROLD, JR.
JAMES H. LINDHOLM
BY
Spencer E. Olson
ATTORNEY INVENTORS:
FREDERICK W. BIDELL
CARL D. HEROLD, JR.
JAMES H. LINDHOLM
BY
Spencer E. Olson
ATTORNEY

INVENTORS:
FREDERICK W. BIDELL
CARL D. HEROLD, JR.
JAMES H. LINDHOLM

BY Spencer E. Olson
ATTORNEY

INVENTORS:
FREDERICK W. BIDELL
CARL D. HEROLD, JR
JAMES H. LINDHOLM
BY Spencer E. Olson
ATTORNEY INVENTORS:
FREDERICK W. BIDELL
CARL D. HEROLD, JR.
JAMES H. LINDHOLM
BY
Spencer E. Olson
ATTORNEY

TABLE 1
COARSE SYNCHRONIZING SUBSYSTEM POWER DISTRIBUTION

| INPUT | SIGNAL PRESENT | SYNCH'D | JAMMING PRESENT | INPUT POWER | SYNC. CHANNEL OUTPUT POWER $S_0$ | REFERENCE CHANNEL OUTPUT POWER $R_0$ | $S_0/R_0$ |
|---|---|---|---|---|---|---|---|
| 1 | YES | NO | NO | $S_{in}$ | $S_{in}\frac{(W_s)(K)}{(W_c)(D)}=\frac{S_{in}}{D}$ | $S_{in}$ | $\frac{1}{D}$ |
| 2 | YES | YES | NO | $S_{in}$ | $S_{in}\frac{(K)}{(D)}$ | $S_{in}$ | $\frac{K}{D}=\frac{W_c}{W_s}\times\frac{1}{D}$ |
| 3 | NO | NOT APPLIC. | YES | $J_{in}$ | $J_{in}\frac{(W_s)(K)}{(W_c)(D)}=\frac{J_{in}}{D}$ | $J_{in}$ | $\frac{1}{D}$ |
| 4 | YES | NO | YES | $S_{in}+J_{in}$ | $\frac{S_{in}+J_{in}}{D}$ | $S_{in}+J_{in}$ | $\frac{1}{D}$ |
| 5 | YES | YES | YES | $S_{in}+J_{in}$ | $\frac{K\ S_{in}+J_{in}}{D}$ | $S_{in}+J_{in}$ | $\frac{\frac{(W_c)}{(W_s)}\left(\frac{S}{J}\right)_{in}+1}{\left(\frac{S}{J}\right)_{in}+1}\times\frac{1}{D}$ |

Fig. 10

INVENTORS:
FREDERICK W. BIDELL
CARL D. HEROLD, JR.
JAMES H. LINDHOLM
BY
Spencer E. Olson
ATTORNEY

SYNCHRONIZING SYSTEMS IN THE PRESENCE OF NOISE

This invention relates generally to pseudo-random communication systems, and more particularly to improved means for synchronizing a correlation receiver over a wide dynamic range in the presence of noise, interference and jamming signals. The invention is also adaptable to signal presence and signal recognition applications in correlation receivers.

The use of pseudo-random techniques in communication systems is becoming more important and increasingly widespread for purposes such as anti-jamming, signal hiding, and privacy. Pseudo-random systems also offer advantages in several other applications, including addressing systems, distance measuring systems, and anti-multipath propagation systems. For purposes of this discussion, a direct sequence pseudo-random correlation system will be considered in which the energy in a radio frequency carrier is dispersed to occupy a relatively wide band of the RF spectrum. This type of communication has been designated by the terms "carrier dispersal" and "spread spectrum," referring to the process by which the energy associated with a carrier is dispersed or distributed over a relatively broad range of frequencies. When the energy of the carrier is spread over a sufficiently wide frequency spectrum, its individual component frequencies become immersed in the background noise of the transmission channel, preventing the signal from being detected except by a selectively addressed receiver.

According to one known spread spectrum technique, the radio frequency signal is dispersed over a broad band of frequencies by modulating the carrier with a coded sequence of pulses derived from a pattern code generator. The outer limits to which the carrier bandwidth is spread in both directions from its basic frequency is $f_h$, which represents the highest frequency component in the modulation signal, and the individual frequencies which comprise the wideband having a spacing of $f_1$, corresponding to the lowest frequency component of the modulation. An even spacing of the transmitted energy is achieved by providing these frequencies with a coded pulse modulation wherein the pulse width provides the bandspread desired, the repetition frequency of the code establishes the spacing between individual frequency components of the band, and the digit sequence of the code follows a pseudo-random pattern. Prior to spreading the carrier frequency of the transmitter, the carrier is modulated by any of the known modulation techniques such as amplitude, frequency, phase, etc., to apply message intelligence to the carrier.

In the addressed receiver, a local code generator capable of generating the same code waveform as is used at the transmitter to disperse the energy in the carrier, modulates a local oscillator separated by the intermediate frequency (IF) from the frequency of the transmitted carrier and heterodynes the resultant output with the received signal in a correlation mixer. The output of the mixer is an IF signal containing only the relatively narrow band of information modulation provided the local code generator is in time synchronism with the receiver code signal modulation. The narrow band information bearing energy in the receiver is a maximum when the locally generated code is correlated with or in time synchronism with the received signal, and the energy level decreases if the receiver modulation leads or lags the incoming signal. Accordingly, the receiver requires a synchronizer to adjust the timing of the receiving pattern generator to maximize the energy in the receiver. The primary functions of the synchronizer are to compensate for timing errors between the transmitter and receiver code pattern generators and for changes in signal path distances which may occur due to variations in ionosphere or Doppler velocities.

Synchronization between the transmitter and receiver, and maximum correlation to accomplish reassembly of the energy spread across the frequency spectrum back into a single carrier frequency (or information bandwidth) is facilitated by employing in both the transmitter and receiver a form of modulation code which has a two valued autocorrelation function. Particularly useful for this purpose are the unique characteristics of the sequences of binary digits known as "-maximum length shift register sequences" described in U.S. Pat. No. 3,069,657 entitled "Selective Calling System" assigned to the assignee of the present application. The so-called "perfect word" outputs of this type of code generator comprise particular binary sequences of "zeros" and "ones" which, when correlated with shifted versions of themselves, provide maximum indication when they are aligned with exactly the same relationship of "one" and "zero" and a relatively minor correlation in all other shifted relationships. These perfect words also have the advantage, which will be referred to in more detail later, that they can, with the aid of suitable logic circuitry, be auto-generated to a sequence length of $2^n-1$ from an $n$-stage shift register.

Broadly speaking, search for correlation between the transmitted code sequence and the one locally generated at the receiver may be accomplished by slightly changing the rate at the receiver pattern generator so that its code sequence, in effect, slides past the received code sequence in the correlation mixer of the receiver. When during this sliding process, the two codes reach a point of precise identical digit alignment, all of their frequency and phase components become mutually additive and a relatively large signal appears in the IF amplifier. This signal applies a disabling voltage to the code frequency change circuit of the receiver code generator to restore the basic code frequency and stop the "search," or coarse synchronization, process. Once this coarse synchronism is attained, the necessary optimizing of the output signal to lock the local code generator to the received signal is accomplished by a fine synchronization process. The present invention is addressed to the problem of coarse synchronization over a wide dynamic range in the presence of high level noise, interference and/or jamming signals.

Referring to FIG. 1, a prior art spread spectrum correlation receiver is shown as comprising a radio frequency amplifier 10, the output of which is applied to a correlation mixer 12 having a second input from a balanced modulator 14, to which signals from a local oscillator 16 and a code generator 18 are applied. The output of the mixer is applied to an intermediate frequency amplifier 20, the output of which is applied in parallel to a signal detector and output circuit 22 and to an amplitude detector 24, for purposes of correlation detection and synchronization. The output of amplitude detector 24 is applied in parallel to a coarse synchronizing circuit 26 and a fine synchronizing circuit 28, which together produce signals to control the frequency or phase shift of a clock 30 which drives code generator 18. The coarse synchronizing circuit includes a frequency shifting circuit 32, for providing a small frequency offset in the drive rate of the code generator during the search mode, and a fixed signal threshold circuit 34, which may be embodied in the IF amplifier; correlation detection is performed by the amplitude detector and threshold such that a " stop search" signal is applied to disable frequency shift circuit 32 when code generator 18 is correlated to the received code. Disabling the frequency shift circuit 32 removes the frequency offset in the drive rate of the code generator to restore the basic code frequency and stop the coarse synchronization process.

In order to examine the operation of a spread spectrum correlation system in the presence of noise and jamming, consider that both CW jamming and broadband, random noise jamming are inserted between the transmitter and receiver. Since the relatively narrow band signal containing the information has been band-spread by the transmitter, the spectral content of the signal arriving at the receiver (FIG. 1) will be roughly as shown in FIG. 2(a). The effective spread bandwidth is equal to the code rate, $W_c$; the effective bandwidth being loosely defined as the bandwidth measured between 3db points of the spread power spectrum. RF amplifier 10 has a bandwidth sufficient to pass the spread spectrum signal. When the receiver generated code is not synchronized with the transmitter, correlation mixer 12 will have a wideband, noise-like output. The effect of mixing a local oscillator modulated with a synchronized code, with the intended signal in the correlation mixer is to convert the spread signal back into its original narrow band content, and provide a maximum amplitude in the narrow bandwidth information bearing output energy. The effect of this correlation mixing on the CW jamming is to spread its power over the band over which the original signal was spread; i.e., the CW jamming is spread in the same fashion that the original narrow band signal was spread by the pseudo-random code in the transmitter. The effect of this mixing on the random noise jamming is essentially to leave it as a broadband of jamming noise. Hence, the spectral content of the output energy from correlation mixer 12, after synchronization, will be as shown in FIG. 2(b).

The output of mixer 12 is fed into IF amplifier 20 whose bandwidth is much narrower than the RF bandwidth. In effect, then, the IF amplifier rejects all of the frequency components of the mixer output except those in a narrow band centered about the intermediate frequency, determined by the mixing action of the transmitted carrier and the frequency of local oscillator 16, and performs an averaging process.

In systems of this type it can be shown that the signal-to-jamming power ratio at the output is given by the input signal-to-jamming power ratio, multiplied by the ratio of the effective spread signal bandwidth $W_c$ to the narrow band IF bandwidth. This ratio of bandwidth is referred to as the process gain of the signal channel, and usually represents the anti-jamming advantage of the receiver. This advantage can be thought of as the power advantage of the psuedo-random receiver with respect to the jamming power level. Stated in a different manner, jamming of a power level sufficient to marginally affect the performance of a conventional receiver would have to be increased in power by the amount of the process gain in order to marginally affect the performance of a psuedo-random system receiver.

In the correlation detection and coarse synchronization process, the amplitude of the narrow band output spectrum of IF amplifier 20 is compared with a fixed threshold level, and if the amplitude of the average IF energy exceeds the threshold, a "stop search" disabling signal is generated indicating signal recognition. Design of a fixed threshold, however, obviously requires prior knowledge of the received signal strength and potential noise and jamming content. The fixed threshold technique, therefore, has obvious dynamic range limitations as demonstrated by FIG. 3 which shows two cases of the IF amplifier output spectrum. For example, if a weaker than anticipated signal is received, the correlated signal peak may never exceed the threshold level, thereby resulting in the receiver continually missing the signal; this case is shown in FIG. 3(a). On the other hand, if a relatively low threshold level is established, or if relatively strong noise and/or jamming signals are received, the narrow band portion of the spread spectrum signal content (FIG. 2(b)) selected by the IF amplifier may have an uncorrelated signal plus noise plus jamming amplitude that almost continually exceeds the threshold level, resulting in false or nearly continual lock-on, as shown by FIG. 3(b).

Some of the disadvantages of the just-described fixed threshold coarse synchronizing technique have been overcome, in the past, by various approaches, including the use of hard limiters and a variety of decision circuit designs. The prior synchronization techniques of which the applicants have knowledge, however, appear to be relatively unreliable, complex, and quite difficult to implement; in addition, the systems appear to be still quite limited in dynamic range and anti-jam protection. Further, at least one of the systems require two or more search cycles to achieve maximum correlation, thereby increasing the time required to lock-on.

With an appreciation of the foregoing shortcomings of available synchronizing techniques in correlation communication systems, applicants have as a general object of the present invention to provide improved means for establishing code correlation (or synchronization) of a local (receiver) stored reference signal with respect to a received signal over a wide dynamic range, particularly against high levels of interference or intentional jamming.

A more particular object of the invention is to provide means for establishing time synchronization over a wide dynamic range in an anti-jam correlation communication system receiver which is relatively simple to implement with available circuit designs, and capable of highly reliable performance.

Another object is to provide a synchronizing system for a signal correlation receiver which is capable of rapid search and lock-on over a wide dynamic range with relative ease of adjustment and operation.

Another object of the invention is to provide a synchronizer for an anti-jam correlation receiver such that the actual anti-jam protection (processing gain of the synchronizer) is equal to or greater than signal channel process gain.

A further object of the invention is to provide a synchronizer for a signal correlation receiver for signal presence and signal recognition applications over a wide dynamic range, particularly in the presence of interference or jamming.

Briefly, these and related objects are achieved by providing a sliding threshold for correlation detection and coarse synchronization which varies as a function of the total energy received (FIG. 2(a)). More specifically, the present synchronization process comprises means for dynamically comparing a signal representative of uncorrelated signal-plus-noise-plus-jamming power (reference channel) to a signal primarily representative of correlated signal power (signal channel) in such a manner that the reference channel output remains essentially invariant with respect to the state of synchronization of the system and provides a variable threshold level for the coarse synchronizer (i.e., variable with respect to the total energy applied to the receiver). Further, a means of automatic gain control (AGC) is provided to further increase system dynamic range. This technique permits synchronization of a system under jamming-plus-noise-to-signal conditions equal to or exceeding signal channel processing gain. Synchronization is acquired within minimum time limits consistent with maintaining the processing gain of the receiver.

Other objects, features, and advantages of the invention, and a better understanding of its organization and operation, will become apparent from the following description, reference being had to the accompanying drawings, in which:

FIG. 10 is a table, designated Table 1, listing the power distribution in the system of FIG. 5 for various input signal conditions.

Figure 4:
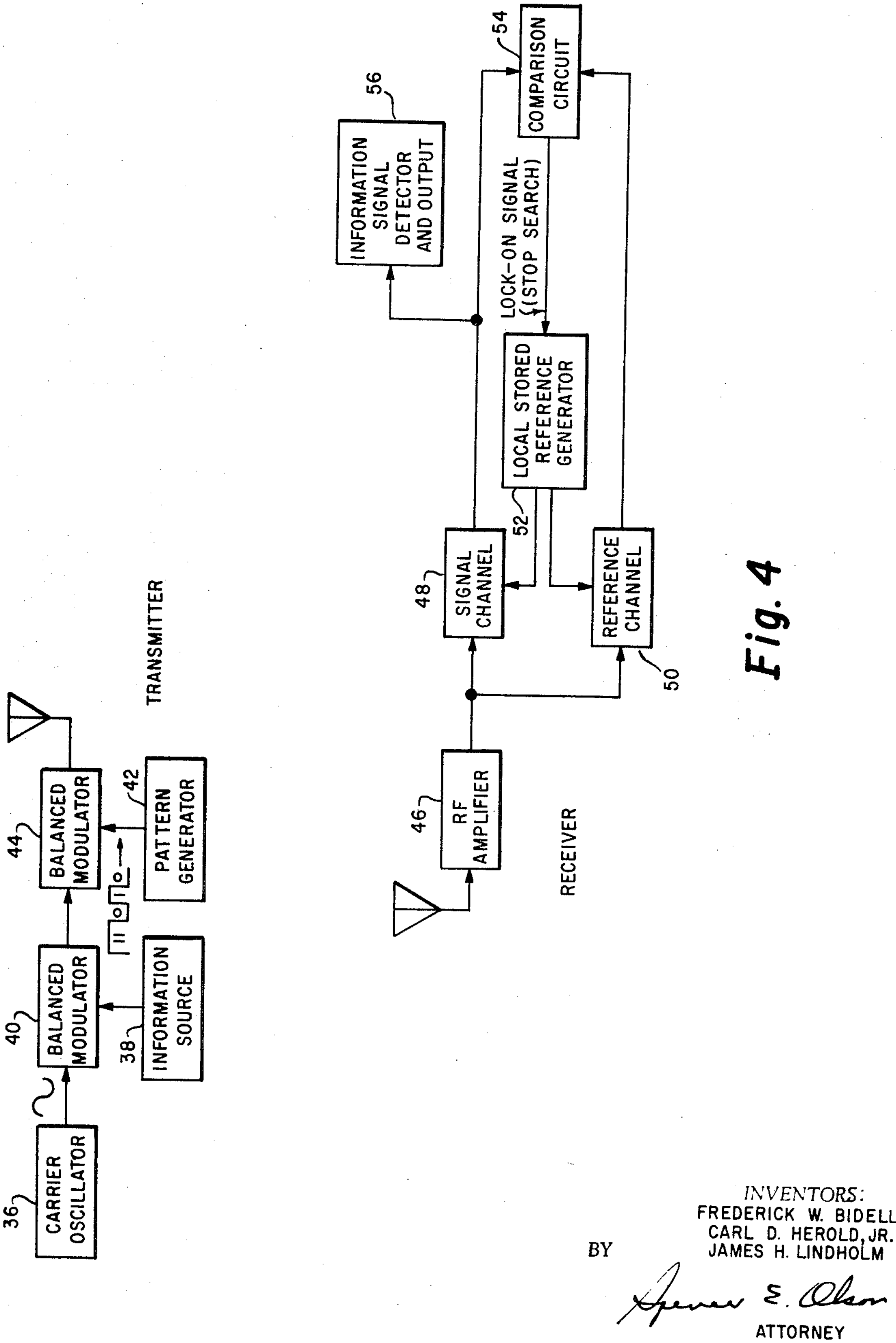
FIG. 4 is a block diagram of a correlation communication system embodying the invention.

Referring now to FIG. 4, the transmitter portion of a correlation communications system comprises a carrier oscillator 36, the output of which is modulated in a balanced modulator 40 by an information signal from a suitable source 38. The output signal from the balanced modulator is further modulated in a second balanced modulator 44 by a signal from a pattern generator 42. The output of balanced modulator 42 may be transmitted directly or translated to a higher carrier frequency.

The pattern generator 42, which is timed by a basic clock signal, produces a predetermined sequence of binary "zeros" and "ones" (or, marks and spaces), preferably of the form known as "maximum length shift register sequences" described in the above-mentioned U.S. Pat. No. 3,069,657. As is fully explained therein, such sequences can, with the aid of suitable logic circuitry, be auto-generated to a sequence length of $2^n-1$ with a shift register having n stages. For example, with a shift register having nine stages and employing a relatively simple feedback logic, a sequence of $2^9-1$ or 511 digits may be derived. There is no need to apply any particular initial contents to the register with the single exception that it not commence operation with a content of nothing but zeros in all stages. If any one or more of the nine stages contains a "one," the register may be driven through a cycle of 511 shifts, and its output thereafter is a sequence whose format is determined by the connections of the logic to the individual stages of the register. As has been mentioned earlier, such sequences, when auto-correlated with shifted versions of themselves, produce maximum indication when they are in exact digit-for-digit alignment and minimum indication in other versions. This characteristic may be demonstrated by adding any perfect word to all possible shifted versions of itself. In the single case of perfect alignment, the "ones" and "zeros" correspond exactly. In all other versions, there is one more disagreement than agreement in a digit-by-digit comparison of the two sequences. If, for example, a perfect word consisting of 511 binary digits is analyzed, there are 255 instances of digit-for-digit identity and 256 instances of digit-for-digit dissimilarity in every possible comparison except the one instance where the two words are in perfect digit-for-digit alignment. It should be pointed out, however, that it is usually unnecessary to compare the entire sequence to establish correlation, it being possible to correlate on only a fraction of the bits in the sequence. The shift register comprising the pattern generator is shifted at a desired code rate to produce a modulating waveform of which a portion is illustrated in FIG. 4. While maximum length shift register sequences are particularly adaptable for use in systems of this kind, the pattern generator 42 may take other forms, inasmuch as any reproducible sequence with pseudo-random properties can be employed to achieve synchronism between the transmitter and receiver of the system.

Figure 1:
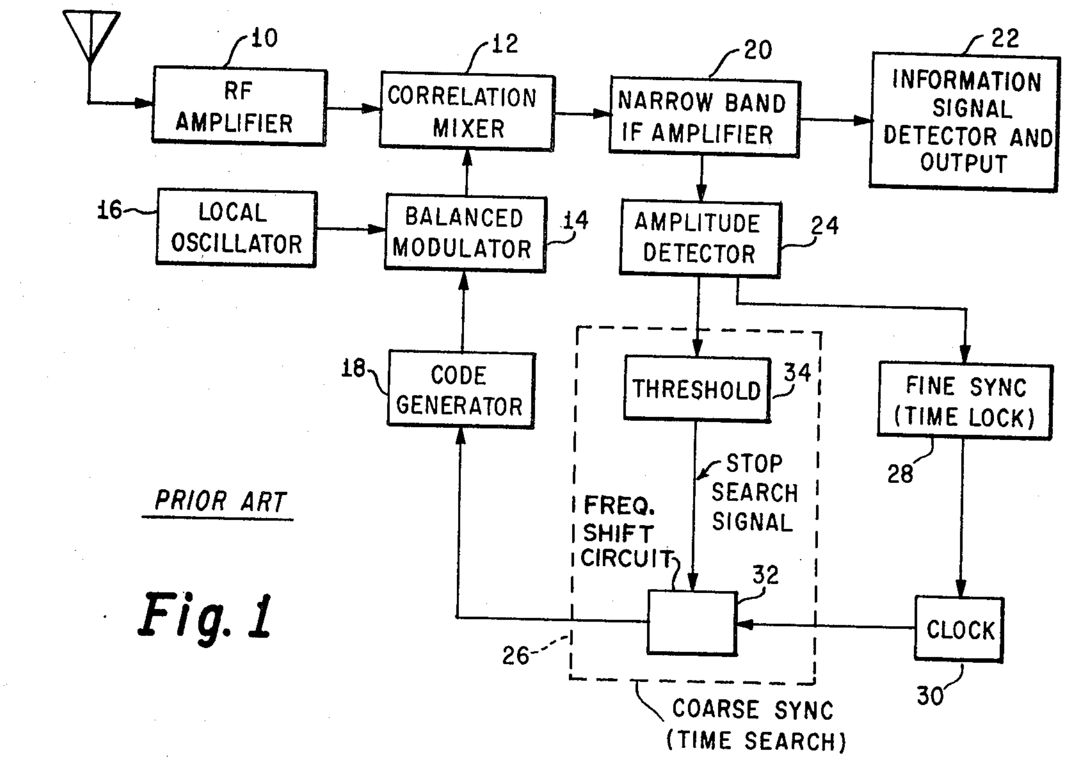
FIG. 1 is a block diagram of a prior art spread spectrum correlation receiver to which previous reference has been made.

The receiver shown in the lower half of FIG. 4 embodies the synchronizing system of the present invention and comprises a radio frequency amplifier 46, the output of which is applied in parallel to a signal channel 48 and a reference channel 50, which may, as will be described in further detail hereinafter, include a common correlation mixer and wide band IF amplifier. The receiver further includes a local stored reference generator 52 which may comprise the clock 30, frequency shift circuit 32, code generator 18, local oscillator 16, and balanced modulator 14 described with reference to FIG. 1. The output of stored reference generator 52 is applied to both the signal and reference channels for the case of a common mixer. In the case of separate mixers in each of channels 48 and 50, the generator 52 output applied to the reference channel mixer is orthogonal or delayed with respect to the locally generated code applied to the signal channel mixer. The output signals from channels 48 and 50 are applied to respective input terminals of a signal comparison circuit 54, which provides a lock-on signal to stop the search cycle of the local stored reference generator upon correlation of the local code with the received code in the signal channel. The output of signal channel 48 is also applied in parallel to an information detector and output circuit 56. Although not specifically shown in FIG. 4, the receiver may also include a fine synchronizer for maintaining correlation.

Figure 2:
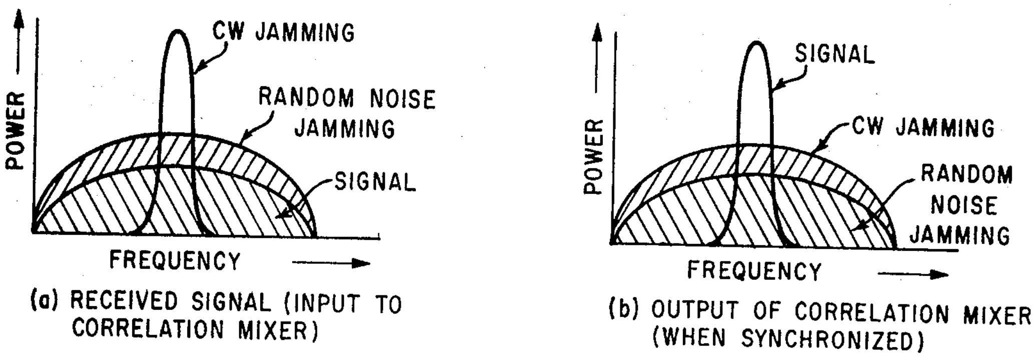
FIG. 2 are curves showing the power spectrum of the signal input and output of the correlation mixer in FIG. 1.
Figure 3:
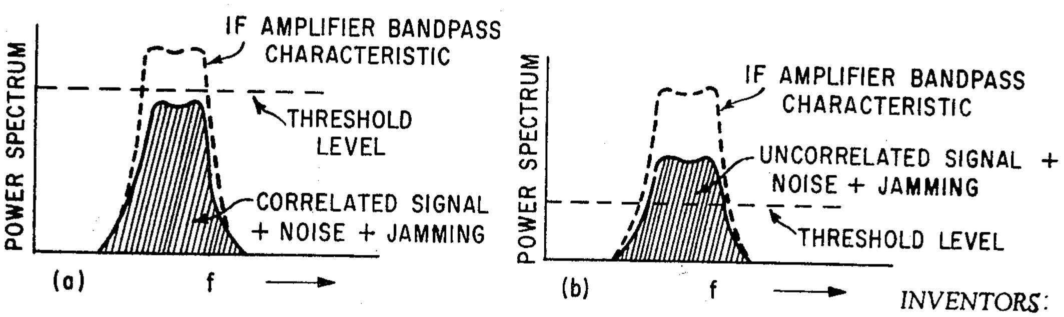
FIG. 3 are curves showing the power spectrum for two cases of the narrow band output of the IF amplifier in FIG. 1 with respect to a fixed threshold level.

Briefly, the receiver picks up the frequency dispersed signal-plus-noise-plus-jamming energy (FIG. 2(b)), which after amplification, is applied to both the signal channel 48 and the reference channel 50 where it is mixed with a locally generated signal from reference generator 52 which has been modulated by pulse sequences of the same critical frequency and phase characteristics as those which modulate the transmitted carrier. The general operation of the receiver is similar to that of the conventional super-heterodyne except that coded pulsing of the local oscillator takes the place of the conventional local oscillator and the receiver modulating code is synchronized (correlated) with the transmitter code by the synchronizing circuits. In searching for correlation, reference generator 52 operates on the average at a slower rate (or faster if desired) than the transmitter pattern generator 42, as previously described. The average code rate of the receiver may be offset from the transmitter code rate by periodically dropping timing pulses (for a slower rate) or adding timing pulses (for a faster rate) to the code generator pulse source or by changing the frequency of the code generator pulse source in the local stored reference. Thus the local code generator, in effect, steps by the received signal binary code sequence, continuously searching for code correlation in a discrete digital manner.

Recognition of code correlation, or coarse synchronization, is provided in the following manner: Signal channel 48 operates in a manner analagous to that of the correlation mixer 12, narrow band IF amplifier 20 and amplitude detector 24 in the system of FIG. 1. As will be described hereinafter, however, the reference channel operates in a manner to provide a signal representative of uncorrelated signal-plus-noise-plus jamming power such that the reference channel output remains essentially invariant with respect to the state of synchronization of the receiver (or may be reduced upon achieving correlation), but nevertheless provides a signal amplitude that is variable as a function of the total signal-plus-noise-plus-jamming energy applied to the receiver. The signal channel output signal amplitude is continuously compared with the output from the reference channel in comparison circuit 54. Whenever code correlation is obtained, the signal channel energy will increase relative to that of the reference channel, and the differential comparison of the two output amplitudes will provide a lock-on signal to stop the synchronizing search cycle upon the occurrence of the correlation peak.

Figure 5:
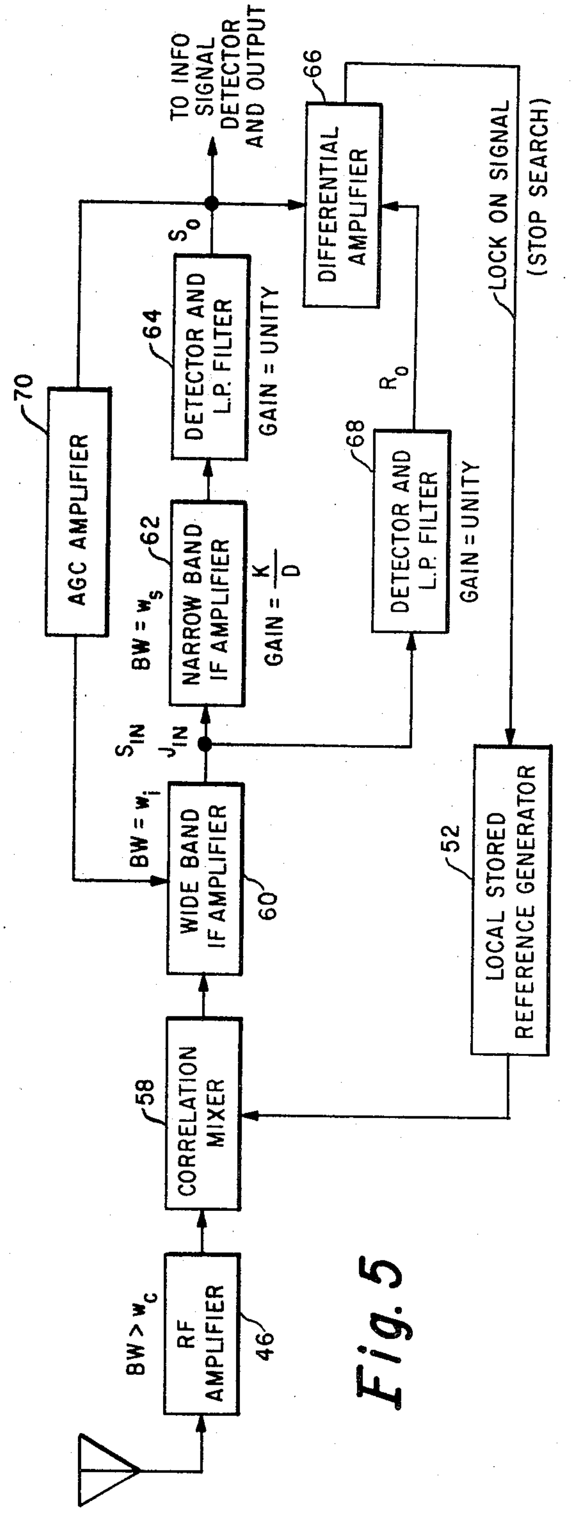
FIG. 5 is a block diagram of one implementation of the receiver portion of the system of FIG. 4.

FIG. 5 illustrates in some detail one circuit implementation of the synchronizing technique employed in the receiver of FIG. 4. In this embodiment the reference channel includes in series connection, a correlation mixer 58, a wideband IF amplifier 60, and a detector and low pass filter 68, the output of the detector and filter (the reference channel signal) being applied to a first input terminal of a differential amplifier 66. The signal channel is narrow band and includes, in common with the reference channel, the correlation mixer 58 and wideband amplifier 60, and further includes a narrow band IF amplifier 62, and a detector and low pass filter circuit 64. The signal output of the signal channel from detector/filter 64 is applied in parallel to a second input terminal of differential amplifier 66, to further information processing circuitry, and through an automatic gain control (AGC) amplifier 70 to control IF amplifier 60. The circuit also includes local stored reference generator 52 which provides a local mixing signal to correlation mixer 58, and has its search cycle disabled by the signal from differential amplifier 66, upon synchronization of the local code sequence with the received code sequence applied to the correlation mixer by RF amplifier 46, as previously discussed.

In the following description of circuit operation, it will be assumed that the only inputs to the system are either the proper transmitted signal of average power $S_{in}$, a jamming signal J of average power $J_{in}$, or a combination of S and J. This input signal is heterodyned with the locally generated spread-spectrum signal in correlation mixer 58; the output spectrum of the correlation mixer depends very strongly on the code characteristics and state of synchronization of the locally generated code with respect to that of the received signal S, as previously discussed. The signal in the wide bandwidth IF stages 60 can be considered in terms of their instantaneous wave forms. Ideally, when the system is perfectly synchronized, the IF signal contribution due to S is phase continuous. However, when the system is not synchronized, the received signal and the local oscillator are uncorrelated, and the resulting IF signal is phase discontinuous. Likewise, as previously pointed out, a jamming signal, whether it be a simple CW signal or a broadband signal, becomes highly phase discontinuous when heterodyned to the IF by the local oscillator.

The analysis to follow is based on the fact that the in-synchronism (phase continuous or correlated) signal components at the output of the correlation mixer are relatively narrow bandwidth signals, whereas the uncorrelated (phase discontinuous) signal and/or jamming components are maintained as wide bandwidth signals. The anti-jam properties of the system stem from ability to discriminate against a portion of the jamming power by using relatively narrow bandwidth circuits following the correlation mixer for performing the demodulation function. Hence, the A-J processing gain is a measure of the jammer's power disadvantage by not having exact knowledge of the code.

The correlation mixer output, therefore, is fed into wide bandwidth IF amplifier 60, which distributes the signal to narrow band IF amplifier 62 in the signal channel and also directly to detector 68 in the reference channel. The purpose of the synchronizer, as previously discussed, is to make gross decisions concerning the state of synchronization of the system based on the relative power levels in the signal and reference channels. In order to analyze the A-J protection of the synchronizing mode performance, the power levels and amplifier gains are normalized in the manner discussed below.

Let $S_{in}$ represent the average signal power output of wideband IF 60; let $J_{in}$ represent the average power of a received jamming signal; and let $W_i$ and $W_s$ denote the bandwidths of the wide-band and narrow-band IF amplifiers 60 and 62, respectively. $W_c$ is defined as the code rate or the effective spread signal bandwidth where $W_c \approx W_i$. The gain K/D of narrow-band IF amplifier 62 may then be defined as follows: Assuming an out-of-synchronization condition with no jamming present, let a gain K be such that the output power level of the narrow band amplifier is equal to the input power level. Since the input signal bandwidth is $W_c$ and the output signal bandwidth is $W_s$, K is approximately $W_c/W_s$; i.e., the signal energy is assumed to be essentially uniformly distributed in frequency within the band $W_c$. This power level is now attentuated by a factor D so that the total gain of the narrow band IF amplifier is K/D. The factor D then represents the relative power gain of the wide band reference channel over the narrow band signal channel. In other words, K is the power gain necessary to provide equal gain bandwidth products in the two channels being compared, and D is the differential power gain between the reference channel and the signal channel to prejudice reference channel decision in the absence of correlation. The factor D may also be referred to as the threshold setting.

The narrow band and wide band signals proceed through a unity gain detection and low pass filtering process in their respective channels, and both channel outputs are applied to differential amplifier 66 where the narrow band IF envelope is continuously compared with the smoothed wide band IF envelope. Let the output average power levels (for both $S_{in}$ and $J_{in}$) of the narrow band signal channel and the wide band reference channel be denoted by $S_o$ and $R_o$, respectively. During the period that the local reference generator is searching for correlation with the received signal (i.e., not synchronized), $R_o$ will exceed $S_o$. However, as illustrated by the functional diagram of FIG. 9 for the FIG. 5 case, whenever code synchronization is obtained, $S_o$ will increase relative to $R_o$. Upon detection of synchronization, the differential amplifier provides a signal which may be used to stop the synchronizing search cycle. Table 1 (FIG. 10) shows $S_o$ and $R_o$ and the ratio $S_o/R_o$ for five system input situations.

Consider the unsynchronized conditions numbered (1), (3), and (4). As previously stated, when the system is not synchronized, it is assumed to be in the search mode, and in order to stop searching, the signal channel detector output $S_o$ must exceed that of the reference channel $R_o$. In the noise free case (1), it is obvious that the system will continue searching as long as D is greater than 1 (i.e., the $S_o/R_o$ ratio is less than unity). In the noisy or jamming environment (3) and (4), which will certainly exist, the certainty of the continuous search must be replaced by a probability which approaches 1 if D is large (i.e., the statistical average of $S_o/R = 1/D$).

However, when the system in the process of searching becomes synchronized, conditions (2) and (5), the output of the signal channel exceeds the output of the reference channel provided $W_c/W_s$ is greater than D. For use in a low signal level, but jam-free, environment (1), D must be adjusted (assuming $W_c/W_s$ is fixed) to provide a satisfactory compromise between the probability of false stops in the search process and the probability of falling out of synchronism (the relationship between these two types of errors for a particular set of system parameters may be shown by deriving and plotting the probability of the failure to recognize synchronization against the amount of desynchronization in fractions of a code bit for various values of the probability of false alarms). In a jamming environment, however, a $J_{in}/S_{in}$ ratio enters into the expression for $S_o/R_o$, as shown in condition (5). With sufficient signal strength, the $J_{in}/S_{in}$ ratio necessary to produce marginal behavior of the synchronizing system is that which makes $S_o/R_o$ unity in case (5). We define that value of $J_{in}/S_{in}$ to be the A-J processing gain of the coarse synchronizing system. It is given by:

$$J_{in}/S_{in} = K - D/D - 1, \text{ where } K = W_c/W_s \qquad \text{Eq. (1)}$$

This expression is derived from, $$\frac{S_o}{R_o} = \frac{\frac{W_c}{W_s}\left(\frac{S}{J}\right)_{in} + 1}{\left(\frac{S}{J}\right)_{in} + 1} \times \frac{1}{D} = 1 \qquad \text{Eq. (2)}$$

For example, if $W_c$ and $W_s$ are approximately 5 mc/s and 50 kc/s, respectively, equation (1) becomes:

$$J_{in}/S_{in} = (100 - D/D - 1) \qquad \text{Eq. (3)}$$

Table 2 below shows a few representative values of $J_{in}/S_{in}$ versus D for these values of $W_c$ and $W_s$:

TABLE 2

A-J PROCESSING GAIN VERSUS THRESHOLD SETTING (D)

| D | D (db) = 10 log D | $J_{in}/S_{in}$ (db) = 10 log $J_{in}/S_{in}$ |
|---|---|---|
| 1.26 | +1 | 25.8 |
| 1.59 | +2 | 22.3 |
| 2 | +3 | 19.9 |
| 2.51 | +4 | 18.1 |
| 3.17 | +5 | 16.4 |
| 4 | +6 | 15.0 |

Considering that the conventional signal channel process gain (10 log $W_c/W_s$) = 20 db for the values of $W_c$ and $W_s$ employed above, it will be noted that the actual antijam protection of the synchronizing system ($J_{in}/S_{in}$ is equal to or greater than signal channel processing gain for threshold settings below +3 db. For example, if a threshold setting of +1 or +2 db is used, a very high jamming power level sufficient to distort the information transmission still would not desynchronize the receiver.

Figure 6:
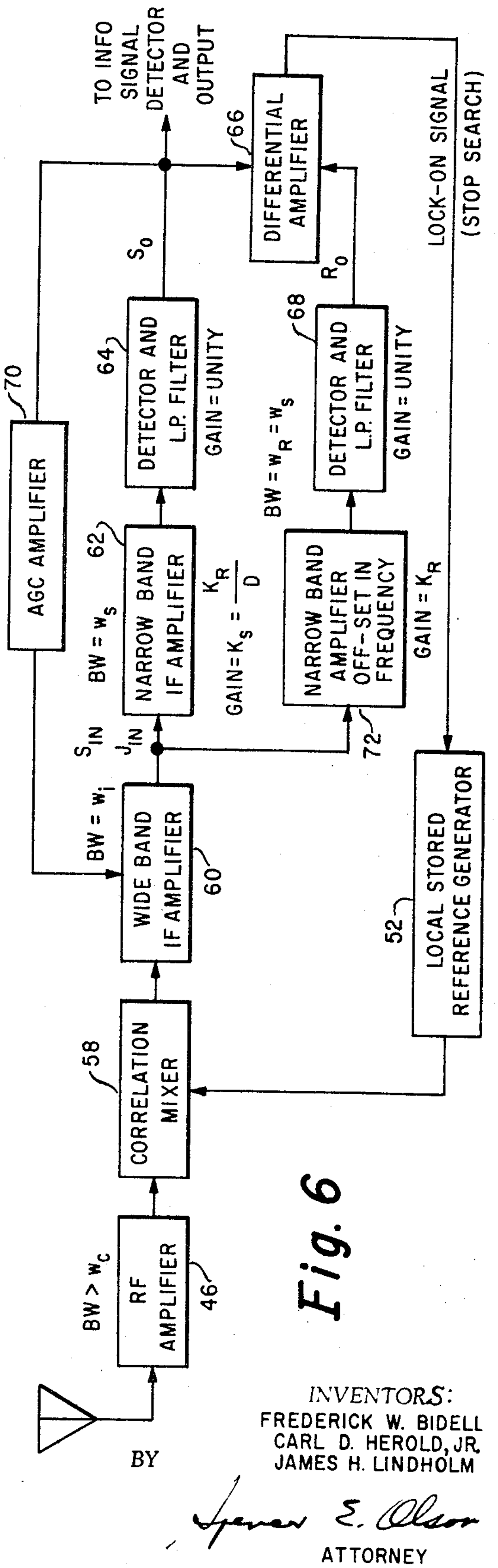
FIG. 6 is a block diagram of a second implementation of the receiver portion of the system of FIG. 4.

FIG. 6 illustrates a second implementation of the synchronizing technique employed in the receiver of FIG. 4. It differs from the circuit of FIG. 5 only in that a narrow band amplifier 72 is inserted in the reference channel between IF amplifier 60 and detector 68. Amplifier 72 has the same bandwidth as the signal channel IF amplifier 62, but is offset in frequency from the signal channel by an amount equal to two or more multiples of the bandwidth of IF amplifier 62. Both channel amplifiers are, however, contained within the bandwidth of wide band amplifier 60. The gain of reference channel amplifier 72 is equal to $K_r$, and the gain of signal channel amplifier 62, $K_s$, is $K_r/D$, where D again represents the differential power gain between the reference channel and signal channel to prejudice reference channel decision in the absence of correlation.

Figure 9:
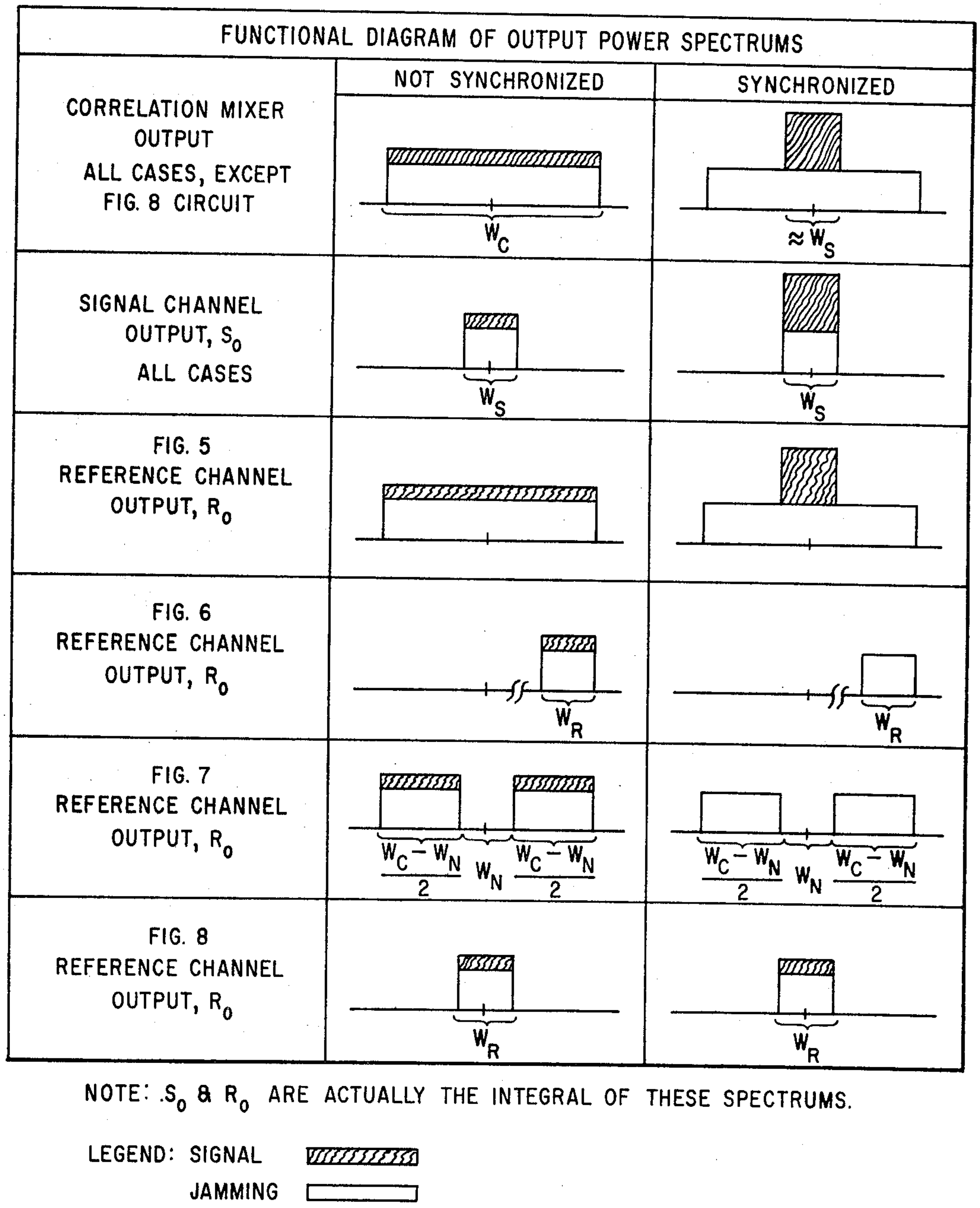
FIG. 9 is a functional diagram of the significant output power spectrums of the circuits of FIGS. 5, 6, 7 and 8.

Referring to the functional diagrams of FIG. 9 for the FIG. 6 circuit, while the receiver is searching for correlation, (i.e., it is not synchronized), the signal channel bandwidth $W_s$ will pass a portion of the wide band amplifier output spectrum that has a signal-plus-jamming energy product that is nearly equal to the portion of the spectrum passed by the reference channel bandwidth $W_r$. The gain prejudicing factor D of the amplifier 72, however, will result in $R_o$ exceeding $S_o$.

When correlation occurs, as previously discussed, all of the correlated signal energy occupies the narrow IF bandwidth $W_s$, and the non-correlated (spread) signal energy disappears from the reference channel; i.e., $W_r$ passes only the uncorrelated jamming energy. The result of signal correlation therefore, is a large increase in the average energy level of the output $S_o$ from the signal channel and a decrease in the output $R_o$ from the reference channel. The differential amplifier recognizes this correlation and provides an output signal as previously described. Table 3 below shows $S_o$ and $R_o$ and the ratio $S_o/R_o$ for input condition 5 of Table 1:

TABLE 3

| Sync. channel output power $S_0$ | Reference channel output power $R_0$ | $S_0/R_0$ |
|---|---|---|
| $\left[S_{in} + J_{in}\frac{W_r}{W_c}\right]\frac{K_r}{D}$ | $J_{in}\frac{W_r}{W_c}K_r$ | $\dfrac{S_{in} + J_{in}\frac{W_r}{W_c}}{J_{in}\frac{W_r}{W_c}D}$ |

In this case, the anti-jam processing gain of the synchronizing system is given by:

$$J_{in}/S_{in} = (W_c/W_s(D-1)) \text{ where } W_c >> W_s \quad \text{Eq. (4)}$$

This expression is derived from $S_o/R_o = 1$, where $W_c$ = code rate and $W_r = W_s$.

If the values of $J_{in}/S_{in}$ versus D were tabulated for $W_c$ = 5 mc/s and $W_r$ = 50 Kc/s, they would be observed to be quite similar to Table 2.

Figures 7, 8:
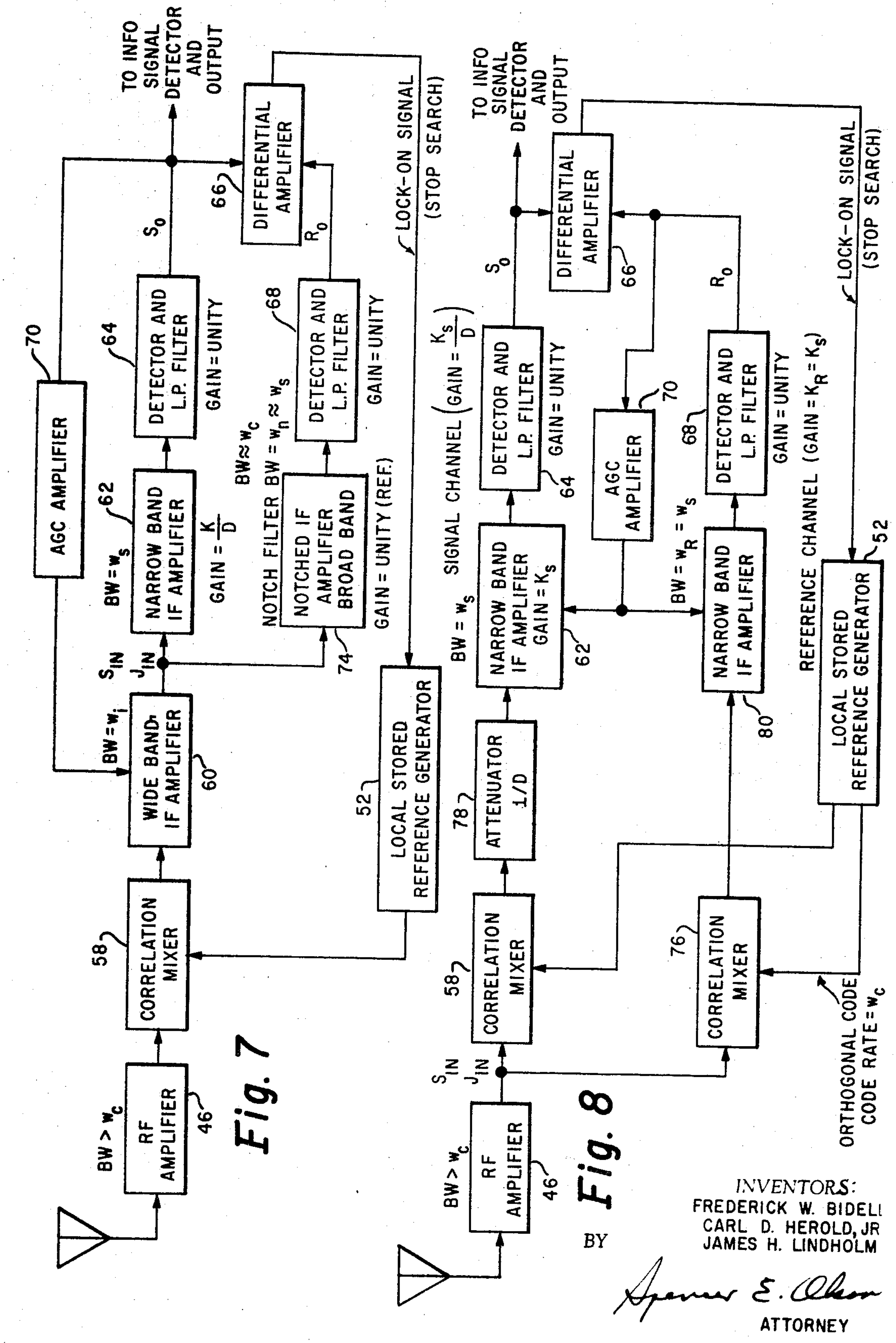
FIG. 7 is a block diagram of a third implementation of the receiver portion of the system of FIG. 4.
FIG. 8 is a block diagram of a fourth implementation of the receiver portion of the system of FIG. 4.

FIG. 7 illustrates a third implementation of the above-described synchronizing technique, differing from the system of FIG. 5 only in that a broadband, notched IF amplifier 74 is inserted in the reference channel between IF amplifier 60 and detector 68. Amplifier 74 has a bandwidth $W_r$ essentially the same as that of wide band amplifier 60, $W_c$, centered about the IF frequency. The notch filter in the reference channel amplifier is centered about the center frequency of the IF with a bandwidth $W_n$ equal to the bandwidth of the correlated signal $W_s$. The gain of narrow band IF amplifier 62 may be defined in a fashion similar to that for FIG. 5: Assuming an out of synchronization condition with no jamming present, let the gain K be such that the output power level of the narrow band amplifier is equal to the output power level of notched amplifier 74. Since the effective output signal bandwidth of amplifier 74 is $W_c - W_n$, K is approximately $(W_c - W_n)/(W_s)$ or $W_c/W_s - W_n/W_s$; but, since $W_n \approx W_s$, then $W_n/W_s \approx 1$, and since $W_c >> W_s$, then $K \approx W_c/W_s$. This power level is now attentuated by the factor D, as in the system of FIG. 5, so that the total gain of the narrow band IF amplifier is K/D, the factor D again representing the relative power gain of the wide band reference channel over the narrow band signal channel. For purposes of calculation, the gain of the reference channel may be considered as unity, since it is used as a reference for determining K/D.

Referring again to the functional diagrams of FIG. 9 as applied to FIG. 7, during search for correlation, the signal channel bandwidth $W_s$ will pass the center portion of the wideband amplifier output signal-plus-jamming spectrum. The reference channel will pass the wide band signal-plus-jamming spectrum with a notch in the center of bandwidth $W_n$ which is approximately equal to $W_s$. The net output energy $R_o$ of the reference channel exceeds the output $S_o$ of the signal channel.

When code correlation is achieved, as previously discussed, all of the correlated signal energy occupies the narrow bandwidth $W_n \approx W_s$; hence, the signal channel $W_s$ will pass the narrow band of correlated signal energy and a portion of the wide band jamming spectrum. At the same time, the correlated signal in the reference channel is rejected by the notch filter, with the consequence that the reference channel passes only the wide band $W_c$ of uncorrelated jamming energy minus the bandwidth of the notched filter $W_n$. The result of signal correlation, therefore, will be a large increase in the output average energy level $S_o$ from the signal channel and a decrease in the net energy output $R_o$ from the reference channel. At high input signal levels, in the absence of interference or jamming, the reference channel output drops to ambient noise level as the system achieves correlation. Differential amplifier 66 provides a correlation recognition signal when $S_o/R_o$ is greater than 1. Table 4 below shows $S_o$, $R_o$, and the ratio $S_o/R_o$ for input condition 5 of Table 1:

TABLE 4

| Sync. channel output power $S_0$ | Reference channel output power $R_0$ | $S_0/R_0$ |
|---|---|---|
| $\dfrac{K\,S_{in} + J_{in}}{D}$ | $J_{in}\left(1-\frac{W_n}{W_c}\right) \approx J_{in}$ | $\dfrac{K\,S_{in} + J_{in}}{D\,J_{in}}$ |

The expression for $S_o$ is identical to and has been derived in the same manner as $S_o$ for condition 5 in Table 1. The quantity $W_n/W_c$ in the expression for $R_o$ is considered insignificant since $W_c >> W_n$, thereby making $W_n/W_c << 1$. In this case the anti-jam processing gain of the synchronizing system is given by:

$$J_{in}/S_{in} = K/D-1 \text{ where } K = W_c/W_s \quad \text{Eq. (5)}$$

This expression is derived from $S_o/R_o = 1$ and is identical to Eq. (4).

FIG. 8 exhibits a fourth implementation of the synchronizing technique employed in the receiver of FIG. 4 in which the reference channel comprises a separate and parallel correlation mixer and IF amplifier. This method enables the implementation advantage of using identical channels, except for an attenuator in one.

The coarse synchronization system shown in FIG. 8 comprises RF amplifier 46, the signal-plus-jamming output of which is applied in parallel to correlation mixer 58 in the signal channel, and a second correlation mixer 76 in the reference channel. The circuit further includes a local stored reference generator 52 which provides a local code sequence to mixer 58 in the signal channel, as previously described, and to the mixer 76 in the reference channel. However, for reasons which will become apparent, the signal applied to mixer 76 is an orthogonal code or the same code with a suitable time delay to insure that the signal channel obtains correlation before the reference channel. The output of mixer 58 is applied through an attenuator 78 to IF amplifier 62, the output of which is applied through detector and low pass filter circuit 64 to one input terminal of differential amplifier 66 and to information processing circuitry. The output of the reference channel correlation mixer is applied through a narrow band IF amplifier 80 and detector and filter circuit 68 to a second input terminal of the differential amplifier. The detected output of the reference channel is also applied through AGC amplifier 70 to provide the AGC function to both narrow band IF amplifiers.

The gains and bandwidths of the reference and signal channel amplifiers are equal and centered about the center frequency of the respective input spread spectrum signals. Hence, if no attenuation were included in the signal channel, the output average power levels of the two channels, $R_o$ and $S_o$, would be equal for the condition where both channels are out of synchronization with no jamming present. Considering that the gain of both amplifiers is equal, an attenuation factor of 1/D is applied to the signal channel, where D again represents the differential power gain between the reference and signal channel to prejudice reference channel decision in the absence of correlation.

While the receiver is searching for correlation, the signal channel bandwidth $W_s$ will pass a portion of the output wideband spectrum from mixer 58 that has a signal-plus-jamming energy that is equal to the portion of the output spectrum from mixer 76 passed by the reference channel bandwidth $W_r$. The signal channel attenuation factor of 1/D, however, will result in the average output power level $R_o$ of the reference channel exceeding the signal channel output $S_o$.

When the local code sequence applied to the signal channel becomes correlated with the received code sequence, the spread signal energy is coherently collapsed into the narrow IF bandwidth $W_s$ to provide a large increase in the average output energy level $S_o$ from the signal channel. The output level of the reference channel, $R_O$, at this time, will remain constant since the local code sequence applied to the reference channel remains uncorrelated, it being orthogonal to the received code sequence or having a suitable time off-set from the local code applied to the signal channel. The result of signal channel correlation, therefore, will be a large increase in $S_o$ above the constant level $R_o$ developed by the reference channel, as illustrated in the last case of the functional diagrams of FIG. 9. The differential amplifier 66 recognizes this condition and provides an output signal which may be used to stop code search.

It is obvious, therefore, that if identical local mixing codes without delay were used and correlation was not achieved first in the signal channel, correlation of the input signal in the reference channel would only further increase the differential amplifier output favoring a continuous search decision; i.e., if the signal and reference channels reached correlation simultaneously, providing equal IF output levels from their respective mixers, the signal channel attentuation factor 1/D would cause $R_o$ to continue to exceed $S_o$.

Table 5 below shows $S_o$ and $R_o$ and the ratio $S_o/R_o$ for signal input condition 5 of Table 1:

TABLE 5

| Sync. channel output power $S_0$ | Reference channel output power $R_0$ | $S_0/R_0$ |
|---|---|---|
| $\left(S_{in} + J_{in}\frac{W_s}{W_c}\right)\frac{K_s}{D}$ | $\left((S_{in} + J_{in})\frac{W_r}{W_c}\right)K_r$ | $\frac{\left[\frac{S_{in}}{J_{in}}\frac{W_c}{W_s}+1\right]}{\left[\frac{S_{in}}{J_{in}}+1\right]}\cdot\frac{1}{D}$ |

In the above expression $K_s/D$ is the power gain of the signal channel (where $K_s$ is the gain of amplifier 62), $K_r$ is the power gain of the reference channel, and $W_c$ is the code rate or effective spread signal bandwidth: $W_c >> W_r$. Considering that $K_r = K_s$ and $W_r = W_s$, the anti-jam processing gain of the synchronizing system, in this case, is given by:

$$\frac{J_{in}}{S_{in}} = \frac{\left(\frac{W_c}{W_s} - D\right)}{D-1} \qquad \text{Eq. (6)}$$

This expression is derived from $S_o/R_o = 1$ and is identical to equation (1). Implementation of this system would obviously impose increased differential gain stability requirements between the two narrow band IF amplifiers, over that required for a single IF amplifier. However, as previously noted, if a separate 1/D attenuator 78 is used in the signal channel, the signal and reference channels may otherwise employ identical circuitry, thereby providing a significant implementation advantage. Of course, specific system requirements might well make it desirable to eliminate use of a separate attenuator, in which case the 1/D attenuation factor may be provided by reducing the gain $K_s$ of IF amplifier 62 with respect to the gain of IF amplifier 80.

Four techniques have been presented for implementation of a basic method of synchronization of a stored reference, spread spectrum system in the presence of noise, interference, and jamming. Choice of the technique used will depend upon system requirements. Each technique is relatively simple to implement (with well known circuitry), to adjust, and operate. Operation over a dynamic range in excess of 100 db is made possible. Synchronization may be obtained in a relatively short time, and the actual anti-jam protection of the synchronizer can be made equal to or greater than signal channel process gain.

A communication system has been described which features preferred embodiments of the invention. It is to be understood however, that the scope of the invention is not limited to such a system or to the particular features and embodiments described, or to the specific frequencies discussed. The analysis and power spectrum representations that have been presented are, of course, not exact, but merely serve to demonstrate, in simplified form the operation of the system. The system described is not limited to a synchronizing function, but may be applied to signal presence applications where the transmitter and receiver codes are locked, and the function is to determine whether a signal is being transmitted or the received input is purely noise or jamming. The system is also suitable for signal recognition situations where the receiver comprises M signal correlation channels, and the function is to recognize which one of M possible code sequences has been transmitted. As has been mentioned, it is not necessary that the described maximum length shift register sequences be used to realize the advantages of the invention. Moreover, use of the described synchronizing technique is not limited to the described direct sequence spread spectrum communication system, but is equally applicable to other digital or analog pseudonoise systems. Accordingly, it is intended that the scope of the invention be limited only by the appended claims.

What is claimed is:

1. In a receiver for a pseudo-random communication system in which a locally generated coded signal is to be correlated with a received similarly coded signal, means for recognizing the synchronization of said local and received signals in the presence of undesired received energy, such as noise, interference, jamming, or combinations thereof, which comprise: a signal channel, a reference channel, means for applying said received coded signal plus undesired signal energy in parallel to said signal and reference channels, means for applying said locally generated coded signal to said signal and reference channels, means included in said reference channel to continually derive an output signal exclusively representative of uncorrelated received energy, means included in said signal channel to derive an output signal representative of correlated signal energy upon synchronization of said local and received signals, said reference channel being gain prejudiced to provide a larger output signal level than said signal channel when said local and received signals are not synchronized and to provide a smaller output signal level than said signal channel when said local and received coded signals are synchronized, and means for comparing the output signal levels from said signal and reference channels and operative to provide an output signal indicating from which of said channels the output signal level is greater.

2. A receiver in accordance with claim 1 including means for phase-locking said locally generated coded signal with said received coded signal in said signal channel in advance of correlation in said reference channel, and wherein said signal comparison means is operative to indicate whether said received energy included said coded signal.

3. A receiver in accordance with claim 1 including means for varying the timing rate of said locally generated code signal to search for a condition of synchronization, and means for applying the output signal from said signal comparison means to said timing rate varying means, said last-mentioned means being operative in response to synchronization of said local and received signals to disable said timing rate varying means.

4. In a receiver for a pseudo-random communication system in which a locally generated coded signal is to be correlated with a received similarly coded signal, means for recognizing the synchronization of said local and received signals in the presence of undesired received energy such as noise, interference, jamming, or combinations thereof, which comprises: a signal channel having input and output terminals and including in series connection between said input and output terminals a mixer circuit, a first intermediate-frequency amplifier having a bandwidth substantially equal to the effective bandwidth of said received signal, a second intermediate-frequency amplifier having a bandwidth much narrower than the bandwidth of said first intermediate frequency amplifier, and a first detector and filter circuit; a reference channel having an input terminal, a mixer and a first intermediate frequency amplifier in common with said signal channel, and an output terminal, said reference channel further including, between said first intermediate frequency amplifier and said output terminal, a second detector and filter circuit; means for applying said received coded signal plus undesired energy to said common input terminal; means for applying said locally generated coded signal to said mixer; said second intermediate frequency amplifier having a gain factor to produce a signal level at the output terminal of said signal channel lower than the signal level at the output terminal of said reference channel when said local and received coded signals are not synchronized and to produce a larger signal level at the output terminal of said signal channel than the signal level at the output terminal of said reference channel when said local and received coded signals are synchronized; and, means connected to the output terminals of said signal and reference channels for comparing the levels of the signals appearing thereat and operative to provide an output signal indicative of which level is higher.

5. A receiver in accordance with claim 4 including means for phase-locking said locally generated coded signal with said received coded signal in said signal channel in advance of synchronization in said reference channel, and wherein said signal comparison means is operative to indicate whether said received energy includes said coded signal.

6. A receiver in accordance with claim 4 further including an automatic gain control amplifier connected between the output terminal of said signal channel and said first intermediate frequency amplifier for applying an automatic gain control signal to said first intermediate frequency amplifier, means for varying the timing rate of said locally generated code signal to search for synchronization, and wherein said signal comparison means comprises a differential amplifier having a pair of input terminals respectively connected to the output terminals of said signal and reference channels and an output terminal, and means operative in response to the signal appearing at the output terminal of said differential amplifier upon synchronization of said local and received coded signals to disable said timing rate varying means.

7. A receiver in accordance with claim 4 including, in said reference channel, a third amplifier connected between said first intermediate frequency amplifier and said second detector and filter circuit, said third amplifier having substantially the same bandwidth as said second intermediate frequency amplifier and being offset in center frequency from the center frequency of said second amplifier by at least two multiples of the bandwidth of said second amplifier.

8. A receiver in accordance with claim 4 further including an automatic gain control circuit connected between the output terminal of said signal channel and said first intermediate frequency amplifier, a third amplifier in said reference channel connected between said first intermediate frequency amplifier and said second detector and filter circuit, said third amplifier having substantially the same bandwidth as said second intermediate frequency amplifier and having a center frequency offset from the center frequency of said second amplifier by at least two multiples of the bandwidth of said second amplifier, means for varying the timing rate of said locally generated code signal to search for synchronization, and wherein said signal comparison means comprises a differential amplifier having a pair of input terminals respectively connected to the output terminals of said signal and reference channels and an output terminal, and means operative in response to the signal appearing at the output terminal of said differential amplifier upon synchronization of said local and received coded signals to disable said timing rate varying means.

9. A receiver in accordance with claim 4 including, in said reference channel, a third intermediate frequency amplifier connected between said first intermediate frequency amplifier and said second detector and filter circuit, said third intermediate frequency amplifier having a bandwidth at least as wide as the bandwidth of said first intermediate frequency amplifier and a notch characteristic which has substantially the same bandwidth as said second intermediate frequency amplifier centered about the common intermediate frequency of said first and second intermediate frequency amplifiers.

10. A receiver in accordance with claim 4 further including an automatic gain control circuit connected between the output terminal of said signal channel and said first intermediate frequency amplifier, a third amplifier in said reference channel connected between said first intermediate frequency amplifier and said second detector and filter circuit, said third amplifier having a bandwidth at least as wide as the bandwidth of said first intermediate frequency amplifier and a notch characteristic which has substantially the same bandwidth as said second intermediate frequency amplifier centered about the common intermediate frequency of said first and second intermediate frequency amplifiers, means for varying the timing rate of said locally generated coded signal to search for synchronization, and wherein said signal comparison means comprises a differential amplifier having a pair of input terminals respectively connected to the output terminals of said signal and reference channels, and an output terminal, and means operative in response to the signal appearing at the output terminal of said differential amplifier upon synchronization of said local and received coded signals to disable said timing rate varying means.

11. In the receiver of a pseudo-random communication system in which a locally generated coded signal is to be correlated with a received similarly coded signal, means for recognizing the synchronization of said local and received signals in the presence of undesired received energy, such as noise, interference, jamming, or combinations thereof, which comprises: a signal channel having input and output terminals and including in series connection between said input and output terminals a first mixer circuit, a first intermediate frequency amplifier having a bandwidth much narrower than the bandwidth of said received signal, and a first detector and filter circuit; a reference channel having an input terminal in common with said signal channel, and an output terminal, said reference channel including in series connection between its input and output terminals a second mixer circuit, a second intermediate frequency amplifier having substantially the same bandwidth as said first intermediate frequency amplifier, and a second detector and filter; means for applying said received coded signal plus undesired energy to said common input terminal; means for applying said locally generated coded signal to said first mixer; means for applying an orthogonally related version of said locally generated coded signal to said second mixer; said signal channel having a gain factor to produce a signal level at the output terminal of said signal channel lower than the signal level at the output terminal of said reference channel when said received and locally generated coded signals are not synchronized and to produce a larger signal level at the output terminal of said signal channel than the signal level at the output terminal of said reference channel when said received and locally generated coded signals are synchronized; and, means connected to the output terminals of said signal and reference channels for comparing the levels of signals appearing thereat and operative to provide an output signal indicative of which level is higher.

12. A receiver in accordance with claim 11 further including an automatic gain control circuit connected between the output terminal of said reference channel and said first and second intermediate frequency amplifier and operative to apply an automatic gain control signal to both said first and second amplifiers, means for varying the timing rate of said locally generated coded signal to search for synchronization in said signal channel, and wherein said signal comparison means comprises a differential amplifier having a pair of input terminals respectively connected to the output terminals of said signal and reference channels, and an output terminal, and means operative in response to the signal appearing at the output terminal of said differential amplifier upon synchronization of said received and locally generated coded signals to disable said timing rate varying means.

13. A receiver in accordance with claim 11 wherein said first and second intermediate frequency amplifiers have substantially the same gain and further including an attenuator connected between said first mixer circuit and said first intermediate amplifier having an attenuation factor to provide the aforesaid gain factor in said signal channel.

14. In a receiver for a correlation communication system in which a locally generated signal is to be correlated with a received signal, means for recognizing the synchronization of said local and received signals, comprising: a signal channel, a reference channel, means for applying said received signal plus undesired signal energy in parallel to said signal and reference channels, means for applying said locally generated signal to said signal and reference channels, means included in said reference channel to continually derive an output signal exclusively representative of uncorrelated received energy, means included in said signal channel to derive an output signal representative of correlated signal energy upon synchronization of said local and received signals, and means for comparing the output signal levels from said signal and reference channels and operative to provide an output signal indicating the state of synchronization of said local and received signals.

* * * * *